United States Patent
Gaiser

(10) Patent No.: US 6,557,514 B1
(45) Date of Patent: May 6, 2003

(54) CLOSED GALLERY MONOBLOC PISTON HAVING OIL DRAINAGE GROOVE

(75) Inventor: Randall R. Gaiser, Chelsea, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/253,786

(22) Filed: Sep. 24, 2002

Related U.S. Application Data

(60) Provisional application No. 60/355,693, filed on Oct. 23, 2001.

(51) Int. Cl.$^7$ .................................................. F02F 7/00
(52) U.S. Cl. .................................................. 123/193.6
(58) Field of Search ........................ 123/193.6; 92/186, 92/206, 208

(56) References Cited

U.S. PATENT DOCUMENTS

| | | | | |
|---|---|---|---|---|
| 3,805,677 A | * | 4/1974 | Clary et al. | 92/186 |
| 4,608,947 A | * | 9/1986 | Stadler | 92/186 |
| 4,785,774 A | * | 11/1988 | Tokoro | 123/193.6 |
| 6,152,016 A | * | 11/2000 | Bahr et al. | 92/208 |

* cited by examiner

*Primary Examiner*—Marguerite McMahon
(74) *Attorney, Agent, or Firm*—Howard & Howard

(57) ABSTRACT

A monobloc piston has a piston head with a combustion bowl formed in its upper surface and a plurality of ring grooves formed in an outer surface of a ring belt. An oil cooling gallery is formed in the piston head which is defined in part by a wall of the combustion bowl and ring belt. The piston has a unitized, immovable piston skirt which is formed as one piece with the pin bosses and fixed at its upper end to the ring belt. Piston rings are disposed in each of the ring grooves, and the piston head is further formed with an oil drainage groove which is located below the lowest of the ring grooves. The oil drainage groove is closed in the vicinity between adjacent pin bores but is open across outer side faces of the pin bores such that oil collected in the oil drainage is drained to the crank case across the open side faces to better manage the flow of oil scraped from the walls of the piston cylinder during operation of the piston to reduce oil consumption and hydrocarbon emissions.

9 Claims, 2 Drawing Sheets

CLOSED GALLERY MONOBLOC PISTON HAVING OIL DRAINAGE GROOVE

The disclosure incorporates provisional patent application No. 60/355,693, filed Oct. 23, 2001, whose priority is claimed for this application.

BACKGROUND OF THE INVENTION

1. Technical Field

This invention relates generally to monobloc pistons for diesel engine applications in which the piston head is formed with an internal oil cooling gallery and includes a piston skirt fixed to the pin bosses and ring belt of the head, and more particularly to the management of lubricating oil scraped from the cylinder walls of the engine during operation of the piston.

2. Related Art

Diesel engines often employ so-called monobloc pistons in which the piston head and skirt are unitized, such that the skirt is immovable relative to the head. The piston head is formed with an internal cooling gallery in which cooling oil is circulated to cool the head during operation.

The piston head includes an outer ring belt in which a number of circumferentially continuous ring grooves are formed. The ring grooves accommodate corresponding piston rings that ride against the wall of the piston cylinder during operation, in known manner. Typically, the lowest of the ring grooves accommodates an oil scrapper ring which serves to scrape oil from the walls of the cylinder in order to limit the amount of oil that passes by the remaining compression rings to minimize "blow-by" and thus hydrocarbon emissions of the engine. Despite best efforts, a certain amount of oil does get by the compression rings. During the downstroke, the oil that is scraped from the walls builds up ahead of the rings and gets trapped between the walls of the piston and the cylinder. Consequently, it is believed that a hydrodynamic film of captured oil builds at the inner face between the oil scrapper ring and, despite high contact pressure, it is caused to escape past the rings.

It is an object of the present invention to improve upon such monobloc pistons by providing better management of the oil scrapped from the cylinder walls to reduce blow-by and thus hydrocarbon emissions of such pistons.

SUMMARY OF THE INVENTION AND ADVANTAGES

A monobloc piston constructed according to a presently preferred embodiment of the invention includes a piston head having a combustion bowl formed in an upper surface of the head and an outer ring belt formed with a plurality of ring grooves in an outer surface of the ring belt. A cooling gallery is formed in the piston head having an outer wall provided at least in part by the ring belt. A pair of pin bosses extend from the piston head opposite the combustion bowl and are formed with axially aligned pin bores. The pin bosses have outer side faces that are spaced laterally inwardly of the outer surface of the ring belt. A piston skirt is fixed at its upper end to the ring belt and is formed as one piece with the pin bosses. According to the invention, the piston head is formed with at least one oil drainage groove below the lowest of the ring grooves which is free of piston rings and open to the outer surfaces of the pin bosses. The invention also contemplates a method of forming a monobloc piston having such features.

The invention has the advantage of providing a monobloc piston with improved oil scrapping management, and more particularly improved drainage of the oil scraped from the walls of the piston to minimize escapement past the rings. The improved oil drainage reduces the buildup and back pressure of oil ahead of the oil scraping ring during the downstroke of the piston, thus allowing more of the oil to be scraped from the walls and less of the oil to escape past the rings, for a recognized reduction in the emission of hydrocarbons from such diesel engines.

THE DRAWINGS

These and other features and advantages of the present invention will become more readily appreciated when considered in connection with the following detailed description and appended drawings, wherein.

DETAILED DESCRIPTION

Figure 1:
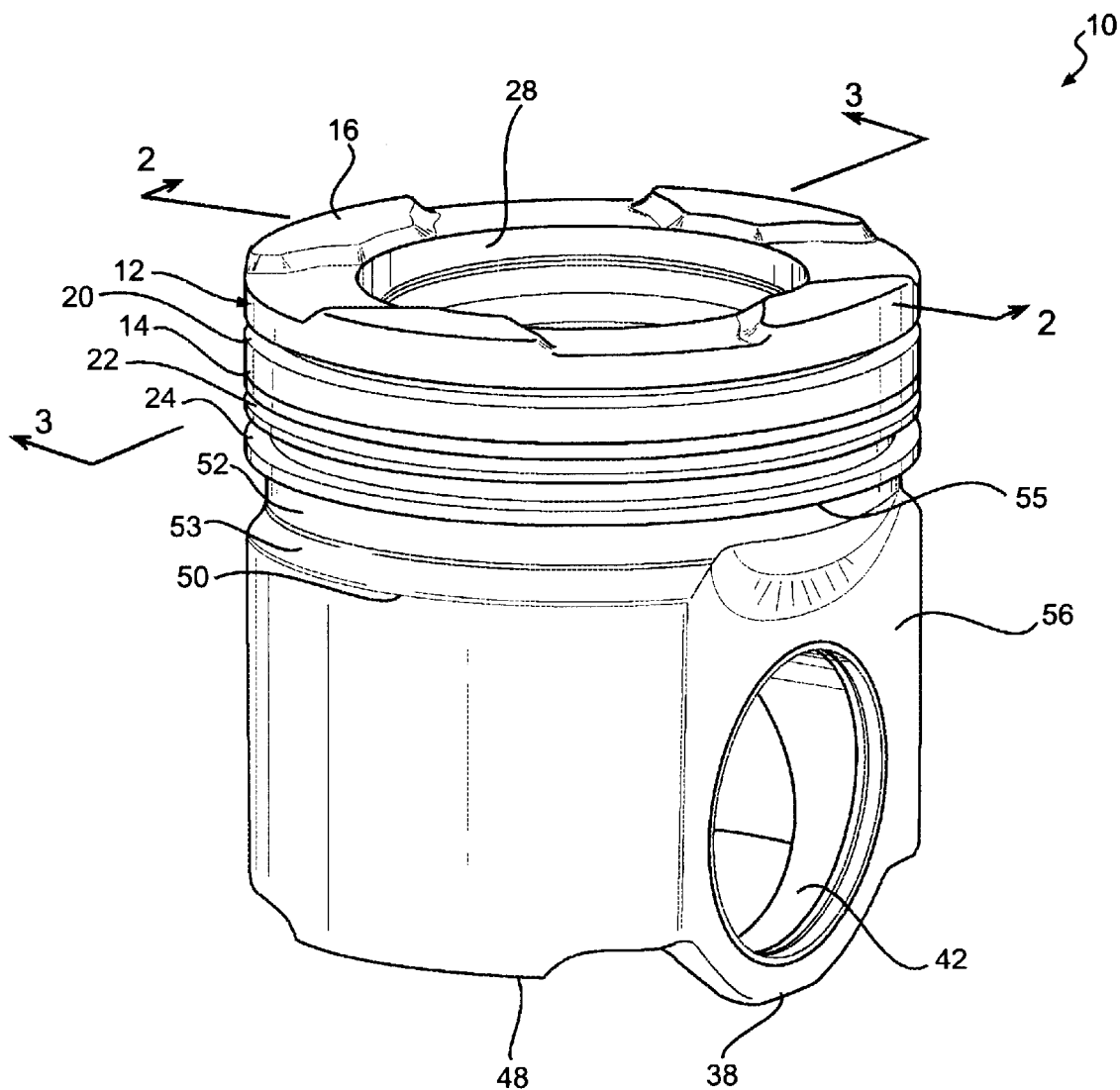
FIG. 1 is a perspective view of a piston constructed according to a presently preferred embodiment of the invention.
Figure 2:
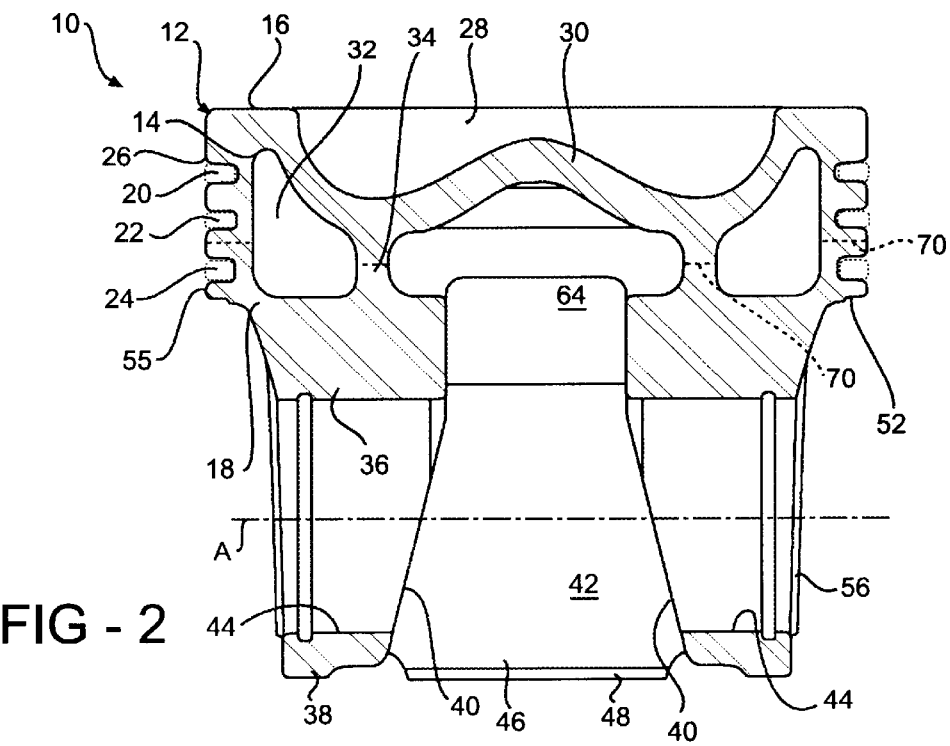
FIG. 2 is a cross-sectional view of the piston of FIG. 1 taken along lines 2—2 of FIG. 1.
Figure 3:
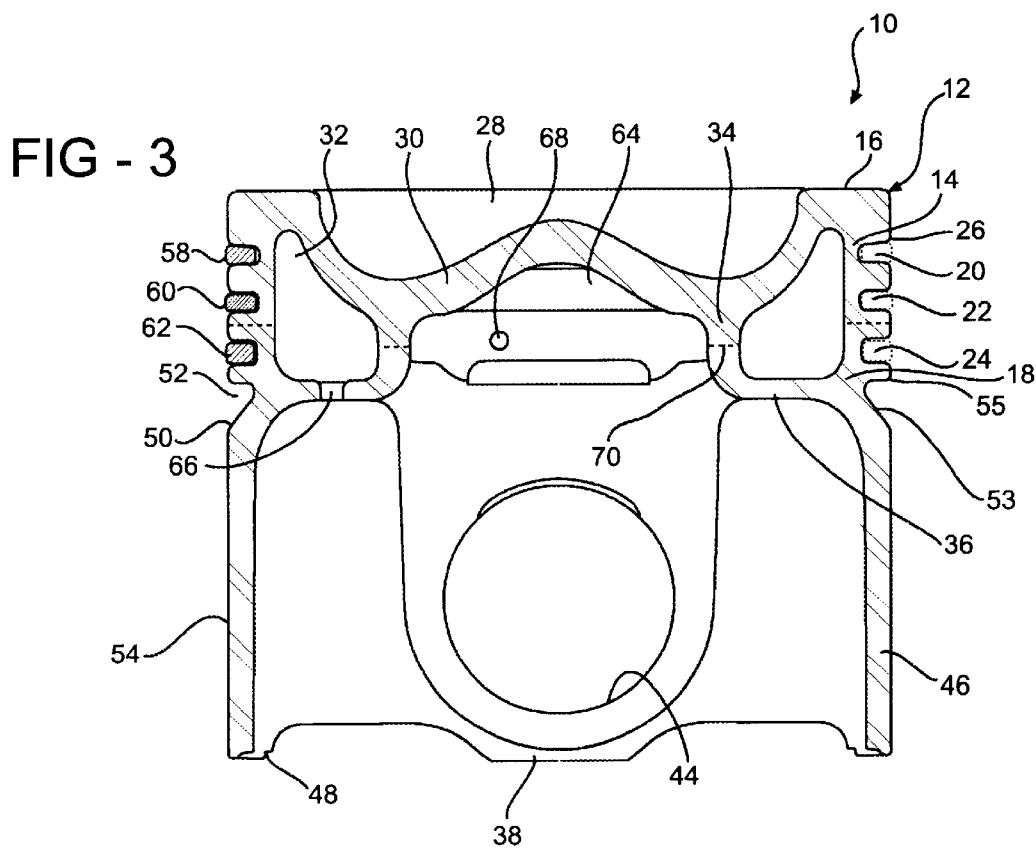
FIG. 3 is a cross-sectional view of the piston of FIG. 1 taken along lines 3—3 of FIG. 1.

FIGS. 1–3 show a closed gallery monobloc piston generally at 10 constructed according to a presently preferred embodiment of the invention. The piston 10 includes an upper head portion or piston head 12 having an outer generally cylindrical ring belt 14 extending between an upper face or surface 16 of the head portion 12 and a lower region 18 spaced from the upper face 16. The ring belt 14 is formed with a plurality of piston ring grooves 20, 22 and 24 machined into an outer surface 26 of the ring belt 14. The outer surface 26 has a predetermined diameter BD, designated as the bore diameter in FIGS. 2 and 3. As shown best in FIG. 3, the wall of the ring belt 14 has a predetermined thickness or width, designated RBW, corresponding to the thickness of the ring belt wall inwardly from the base of the ring grooves 20, 22 and 24.

The head portion 12 is formed with a combustion bowl 28 machined into the upper face 16 of the head portion 12 radially inwardly from the ring belt 14 and presenting a contoured combustion bowl wall 30. The head portion 12 has a predetermined top land height designated TLH, measured from the top of the upper ring groove 20 and the upper surface 16 as shown in FIG. 2.

The piston 10 has an internal, annular oil gallery 32 having an outer wall defined in part by the ring belt 14 and upper wall defined by the combustion bowl wall 30. The oil gallery 32 is further bound by an inner annular support wall 34 which is spaced radially inwardly from the ring belt 14 and extends between the combustion bowl wall 30 and a lower circumferentially extending wall 36 which further extends between the inner support wall 34 and ring belt 14 in spaced relation to the combustion bowl wall 30 and closes off the bottom of the oil gallery 32. The inner support wall 34 has a predetermined inner support wall width, designated ISW, and defines an inner support mean diameter, designated ISMD, of predetermined dimension as illustrated in FIG. 2. The top of the oil gallery 32 extends above the top of the upper ring groove 20 by a predetermined distance designated GRP in FIG. 3. The oil gallery 32 has a predetermined gallery volume, designated GV in FIG. 3.

As shown best in FIG. 2, a pair of pin bosses 38 extend downwardly from the head portion 12 and have inner faces 40 which are spaced axially from one another to define a space 42 for receiving the upper end of a connecting rod therein. The pin bosses 38 are formed with axially aligned pin bores 42 along a pin bore axis A. The pin bores 44 receive a wrist pin (not shown) which couples the piston 10 to the connecting rod (not shown). The piston 10 has predetermined compression height, designated CH in FIG. 2, measured between the pin bore axis A and the top surface 16 of the head portion 12.

The piston 10 is formed with an integral piston skirt 46. The skirt 46 extends downwardly from the ring belt 14 of the head portion 12 and is coupled or unitized immovably to each of the pin bosses 38 on opposite sides of the piston. The piston skirt 46 extends between a lower surface 48 and an upper surface 50. The skirt 46 has a predetermined skirt length, designated SL measured between the lower and upper surfaces 48, 50 of the skirt, as shown in FIG. 3. An oil drainage groove 52 is machined into the outer surface 26 of the ring belt 14 adjacent its lower region 18, separating the outer surface 26 of the ring belt from an outer surface 54 of the skirt 46 and defining the upper surface 50 of the skirt 46. The groove 52 does not extend through to the gallery 32 nor to the interior of the skirt 46 and is preferably aligned radially with the bottom wall 36 of the gallery 32. A bottom wall 53 of the oil groove 52 extends circumferentially about the piston 10 between the pin bosses 38, but is interrupted across the region of the pin bosses 38, such that the oil groove 50 opens up to the recessed outer planar faces 56 of the pin bosses 38 as illustrated in FIG. 2, permitting any oil gathered in the oil groove 52 to drain downwardly back into the crank case across the region of the outer faces 56. An upper wall 55 of the oil drainage groove 52 is preferably continuous about the circumference of the piston body 12. As shown in FIG. 3, piston rings 58, 62 and 64 are accommodated in the ring grooves 20, 22 and 24, respectively, while the oil groove 52 is free of any piston rings.

The space 42 between the pin bores is open to the combustion bowl wall 30. Thus, there is a space 64 below the combustion bowl wall 30 and radially bound by the inner support wall 34 that is open to the space 42 between the pin bores. The oil gallery 32 is formed with one or more oil inlets, schematically shown at 66 in FIG. 3, that communicate with one or more corresponding oil jets (not shown) in operation of the piston for directing cooling oil into the oil gallery 32 to cool the surrounding walls of the gallery 32 with a known "cocktail-shaker" action of the oil as a result of the reciprocating movement of the piston 10 in operation. Oil introduced to the oil gallery 32 is permitted to escape through one or more discharge ports, schematically shown at 68 in FIG. 3, into the inner space 64 for drainage back into the crank case (not shown).

To form the closed oil gallery 32, the piston 10 may be initially formed from two or more component parts machined with the oil gallery features which are subsequently joined to one another to form the closed gallery 32 in a subsequent joining operation. In the illustrated embodiment, the piston 10 is formed from separate upper and lower crown parts which are joined preferably by friction welding across parting line 70, shown in FIG. 2. Of course, other forms of welding, brazing, or securing of the crown parts (e.g., bolting) are contemplated by the invention.

The piston 10 is fabricated of steel and has the following dimensional relationships that enable the piston to operate successfully under high cylinder pressures in the vicinity of 300 bar. Of course, this is but one exemplary embodiment, and the oil drainage groove 52 could be used with other monobloc piston configurations that do not meet the following dimensional criteria:

ISMD=42–55% of BD

ISW=3–8% of BD

CH>53% of BD

TLH>4% of BD

GRP>0

SL=30–80% of BD

SW=2.5–6.5% of BD

GV=150–250% of $BD^2$ and 5–20% of $BD^2 \times CH$

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A monobloc piston assembly comprising:
   a piston head having a combustion bowl formed in an upper surface thereof and a ring belt formed with a plurality of ring grooves in an outer surface of said ring belt;
   a plurality of piston rings disposed in said ring grooves;
   an oil cooling gallery formed in said piston head adjacent said combustion bowl and said ring belt;
   a pair of pin bosses extending from said piston head formed with axially aligned pin bores and having axially oppositely facing outer surfaces;
   a piston skirt formed as one immovable piece with said pin bosses and united at an upper end thereof to said ring belt; and
   an oil drainage groove formed in said piston head at a location below said ring grooves, said oil drainage groove being free of any piston rings and being open to said outer surfaces of said pin bosses, said oil drainage groove including a bottom wall that extends substantially circumferentially continuously between said pin bosses and which is interrupted by said outer surfaces of said pin bosses.

2. The assembly of claim 1 wherein said oil cooling gallery includes a bottom wall.

3. The assembly of claim 2 wherein said oil drainage groove is radially aligned with said bottom wall of said oil cooling gallery.

4. The assembly of claim 1 wherein said oil drainage groove is closed to said oil cooling gallery and to an interior of said skirt.

5. The assembly of claim 1 wherein said oil drainage groove includes an upper wall that is circumferentially continuous about said piston head.

6. The assembly of claim 1 wherein said oil drainage groove has bottom wall floor surface spaced above said pin bores.

7. The assembly of claim 1 wherein said oil drainage groove is continuous with said ring belt and said skirt.

8. A method of fabricating a monobloc piston comprising:
   forming a piston head having a combustion bowl in a top surface and forming a plurality of ring grooves in an outer surface of a ring belt;
   forming an oil cooling gallery in the piston head and providing pin bores in a pair of pin bosses extending from the piston head opposite the combustion chamber;
   forming outer side surfaces on the pin bosses that are recessed inwardly of the outer surface of the ring belt;

forming a piston skirt as a one piece immovable structure relative to the piston body and pin bosses;

forming an oil drainage groove in the piston head that is continuous between the pin bosses and is discontinuous and open across the side surfaces of the pin bosses; and disposing piston rings in the ring grooves while leaving the oil drainage groove free of any piston rings.

9. A monobloc piston assembly comprising:

a piston head having a combustion bowl formed in an upper surface thereof and a ring belt formed with a plurality of ring grooves in an outer surface of said ring belt;

a plurality of piston rings disposed in said ring grooves;

an oil cooling gallery formed in said piston head adjacent said combustion bowl and said ring belt;

a pair of pin bosses extending from said piston head formed with axially aligned pin bores and having axially oppositely facing outer surfaces;

a piston skirt formed as one immovable piece with said pin bosses and united at an upper end thereof to said ring belt; and an oil drainage groove formed in said piston head at a location below said ring grooves, said oil drainage groove being free of any piston rings and being open to said outer surfaces of said pin bosses, said oil drainage groove is closed to said oil cooling gallery and to an interior of said skirt.

* * * * *